United States Patent
Rooyen et al.

(10) Patent No.: US 7,148,845 B2
(45) Date of Patent: Dec. 12, 2006

(54) ANTENNA ARRAY INCLUDING VIRTUAL ANTENNA ELEMENTS

(75) Inventors: Pieter van Rooyen, San Diego, CA (US); Pieter Roux, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 259 days.

(21) Appl. No.: 10/645,349

(22) Filed: Aug. 21, 2003

(65) Prior Publication Data

US 2004/0104844 A1 Jun. 3, 2004

Related U.S. Application Data

(60) Provisional application No. 60/405,285, filed on Aug. 21, 2002.

(51) Int. Cl.
   *H01Q 3/00* (2006.01)
(52) U.S. Cl. ..................................... 342/377
(58) Field of Classification Search ............. 342/368, 342/377, 378, 383, 374
   See application file for complete search history.

(56) References Cited

U.S. PATENT DOCUMENTS

| | | | |
|---|---|---|---|
| 3,510,876 A * | 5/1970 | Green et al. ............ | 342/368 |
| 5,537,367 A | 7/1996 | Lockwood et al. | |
| 5,955,991 A * | 9/1999 | Kawakubo ............. | 342/374 |
| 6,275,543 B1 | 8/2001 | Petrus et al. | |
| 6,347,234 B1 | 2/2002 | Scherzer | |
| 6,380,884 B1 * | 4/2002 | Satou et al. ........... | 342/70 |
| 6,989,789 B1 * | 1/2006 | Ferreol et al. ......... | 342/378 |
| 2001/0026197 A1 | 10/2001 | Tomisato et al. | |
| 2002/0033766 A1 | 3/2002 | Pratt | |
| 2005/0030228 A1 * | 2/2005 | Judd ..................... | 342/383 |
| 2005/0195103 A1 * | 9/2005 | Davis et al. ........... | 342/450 |

OTHER PUBLICATIONS

T. Rouphael et al., Enhanced CDMA cellular system using interpolated uniform linear arrays, IEEE International Conference on Communications, vol. 1, p. 531-535, Jun. 1996.*
R. Klukas et al., Line-of-sight angle of arrival estimation in the outdoor multipath environment, IEEE Transactions on Vehicular Technology, vol. 47(1), p. 342-351, Feb. 1998.*
J. Kivinen et al., Calibration scheme for synthesizer phase fluctuations in virtual antenna measurements, Microwave and Optical Technology Letters, vol. 26(3), p. 183-187, Aug. 2000.*
PCT/US03/26567—International Search Report or the Declaration mailed Mar. 12, 2004.
Chae-Hyun L et al, "Channel Capacity Enhancement using Virtual Array Elements in Smart Antenna Systems", ICC 2002, 2002 IEEE International Conference on Communications, Nw York, NY, Apr. 28-May 2, 2002, IEEE International Conference on Communications, NY, vol. 1 of 5, pp. 155-159, XP010589477, ISBN: 0-7803-7400-2.

* cited by examiner

*Primary Examiner*—Thomas H. Tarcza
*Assistant Examiner*—Fred H Mull
(74) *Attorney, Agent, or Firm*—McAndrews, Held & Malloy

(57) ABSTRACT

A method and associated system for effectively increasing the number of antenna elements within a multi-element antenna system through computation of a response of "virtual" antenna elements located along an antenna array. The physical elements of the array are positioned sufficiently near each other to enable synthesis of a polynomial or other mathematical expression characterizing the response of the array to receipt of an incident waveform. Values of the responses associated with the virtual antenna elements of the array may then be determined through evaluation of the synthesized polynomial or other expression. The resultant array response values associated with the virtual and physical elements of the array are then provided to an associated receiver for processing.

16 Claims, 13 Drawing Sheets

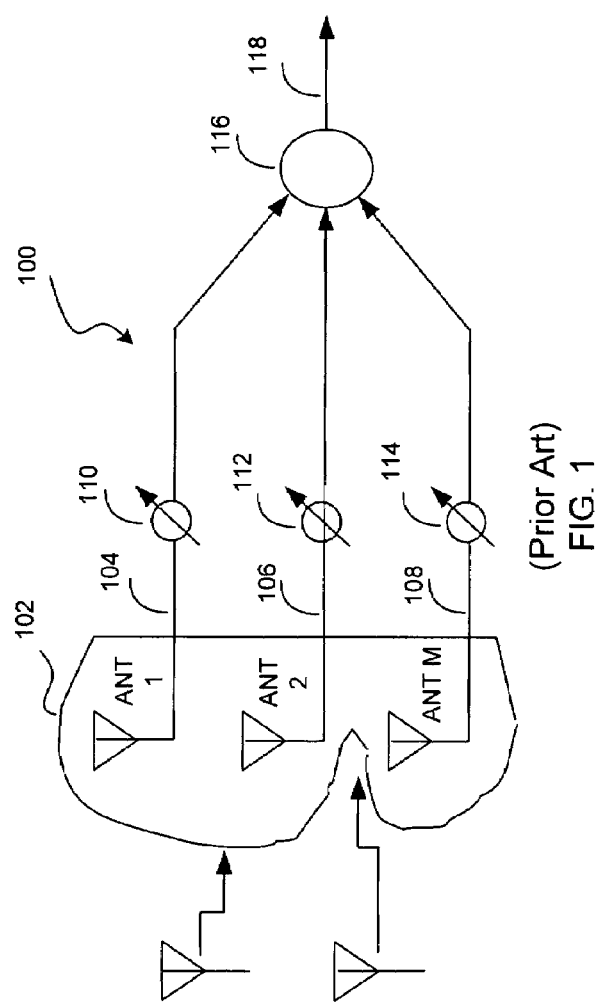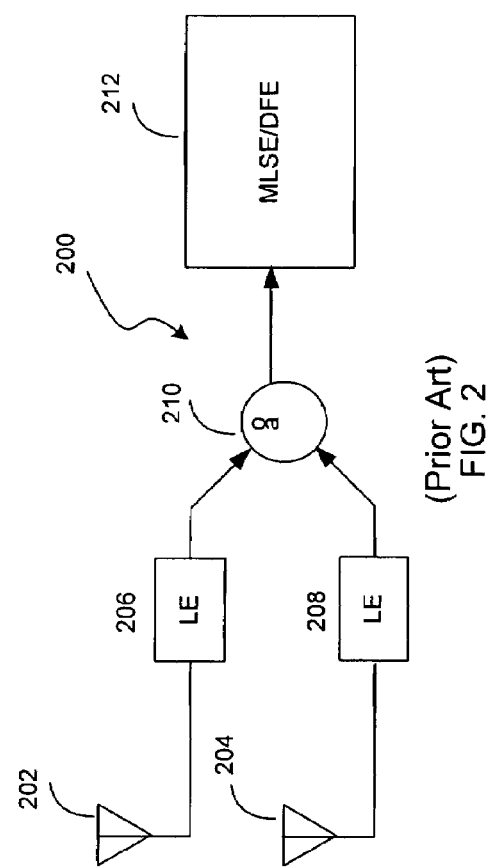

ANTENNA ARRAY INCLUDING VIRTUAL ANTENNA ELEMENTS

CROSS-REFERENCE TO RELATED APPLICATION

This application claims priority under 35 U.S.C. §119(e) to U.S. Provisional Application No. 60/405,285 entitled ANTENNA ARRAY INCLUDING VIRTUAL ANTENNA ELEMENTS, filed Aug. 21, 2002, which is incorporated herein by reference in its entirety.

BACKGROUND OF THE INVENTION

1. Field of the Invention

The present invention relates to a multi-element antenna receiver for radio communication systems, and more particularly to signal processing for multiple receive antennas of an associated receiver.

2. Background Information

It has recently been proposed that both the performance and capacity of existing wireless systems could be improved through the use of so-called "smart" antenna techniques. In particular, it has been suggested that such techniques, coupled with space-time signal processing, could be utilized both to combat the deleterious effects of multipath fading of a desired incoming signal and to suppress interfering signals. In this way both performance and capacity of digital wireless systems in existence or being deployed (e.g., CDMA-based systems, TDMA-based systems, WLAN systems, and OFDM-based systems such as IEEE 802.11a/g) may be improved.

It is anticipated that smart antenna techniques will be increasingly utilized both in connection with deployment of base station infrastructure and mobile subscriber units (e.g, handsets) in cellular systems in order to address the increasing demands being placed upon such systems. These demands are arising in part from the shift underway from current voice-based services to next-generation wireless multimedia services and the accompanying blurring of distinctions among voice, video and data modes of transmission. Subscriber units utilized in such next-generation systems will likely be required to demonstrate higher voice quality relative to existing cellular mobile radio standards as well as to provide high-speed data services (e.g., as high as 10 Mbits/s). Achieving high speed and high quality of service, however, is complicated because it is desireable for mobile subscriber units to be small and lightweight, and to be capable of reliably operating in a variety of environments (e.g., cellular/microcellular/picocellular, urban/suburban/rural and indoor/outdoor). Moreover, in addition to offering higher-quality communication and coverage, next-generation systems are desired to more efficiently use available bandwidth and to be priced affordably to ensure widespread market adoption.

In many wireless systems, three principal factors tend to account for the bulk of performance and capacity degradation: multipath fading, delay spread between received multipath signal components, and co-channel interference (CCI). As is known, multipath fading is caused by the multiple paths which may be traversed by a transmitted signal en route to a receive antenna. The signals from these paths add together with different phases, resulting in a received signal amplitude and phase that vary with antenna location, direction and polarization, as well as with time (as a result of movement through the environment). Increasing the quality or reducing the effective error rate in order to obviate the effects of multipath fading has proven to be extremely difficult. Although it would be theoretically possible to reduce the effects of multipath fading through use of higher transmit power or additional bandwidth, these approaches are often inconsistent with the requirements of next-generation systems.

As mentioned above, the "delay spread" or difference in propagation delays among the multiple components of received multipath signals has also tended to constitute a principal impediment to improved capacity and performance in wireless communication systems. It has been reported that when the delay spread exceeds approximately ten percent (10%) of the symbol duration, the resulting significant intersymbol interference (ISI) generally limits the maximum data rate. This type of difficulty has tended to arise most frequently in narrowband systems such as the Global System for Mobile Communication (GSM).

The existence of co-channel interference (CCI) also adversely affects the performance and capacity of cellular systems. Existing cellular systems operate by dividing the available frequency channels into channel sets, using one channel set per cell, with frequency reuse. Most time division multiple access (TDMA) systems use a frequency reuse factor of 7, while most code division multiple (CDMA) systems use a frequency reuse factor of 1. This frequency reuse results in CCI, which increases as the number of channel sets decreases (i.e., as the capacity of each cell increases). In TDMA systems, the CCI is predominantly from one or two other users, while in CDMA systems there may exist many strong interferers both within the cell and from adjacent cells. For a given level of CCI, capacity can be increased by shrinking the cell size, but at the cost of additional base stations.

The impairments to the performance of cellular systems of the type described above may be at least partially ameliorated by using multi-element antenna systems designed to introduce a diversity gain into the signal reception process. There exist at least three primary methods of effecting such a diversity gain through decorrelation of the signals received at each antenna element: spatial diversity, polarization diversity and angle diversity. In order to realize spatial diversity, the antenna elements are sufficiently separated to enable low fading correlation. The required separation depends on the angular spread, which is the angle over which the signal arrives at the receive antennas.

In the case of mobile subscriber units (e.g, handsets) surrounded by other scattering objects, an antenna spacing of only one quarter wavelength is often sufficient to achieve low fading correlation. This permits multiple spatial diversity antennas to be incorporated within a handset, particularly at higher frequencies (owing to the reduction in antenna size as a function of increasing frequency). Furthermore, dual polarization antennas can be placed close together, with low fading correlation, as can antennas with different patterns (for angle or direction diversity).

Although increasing the number of receive antennas enhances various aspects of the performance of multi-antenna systems, the necessity of providing a separate RF chain for each transmit and receive antenna increases costs. Each RF chain is generally comprised of a low noise amplifier, filter, downconverter, and analog to digital to converter (A/D), with the latter three devices typically being responsible for most of the cost of the RF chain. In certain existing single-antenna wireless receivers, the single required RF chain may account for in excess of 30% of the receiver's total cost. It is thus apparent that as the number of receive antennas increases, overall system cost and power consumption may dramatically increase. It would therefore be desirable to provide a technique that effectively provides additional receive antennas without proportionately increasing system costs and power consumption.

SUMMARY OF THE INVENTION

In one embodiment, the invention can be characterized as a method, and means for accomplishing the method, for processing a signal received by an antenna array, the method including receiving M replicas of the signal, each of the M replicas being received by one of a corresponding M physical antenna elements of the antenna array; determining M responses of the M physical antenna elements to the signal, each of the M responses corresponding to one of the M physical antenna elements; and generating, as a function of the M responses, N responses to the signal, wherein each of the N responses represents a response to the signal at a different spatial location along the antenna array.

In another embodiment, the invention can be characterized as an antenna system for receiving a signal comprising: an antenna array including M physical antenna elements, wherein the M physical antenna elements are spatially arranged to receive one of a corresponding M replicas of the signal so as to be capable of generating M replicas of the received signal; and an array processing module including M signal processing chains, wherein each of the M signal processing chains is coupled to one of the M physical antenna elements. The array processing module is configured to generate N signal response values for the antenna array as a function of the M replicas of the received signal, the N signal response values including at least one virtual antenna response value, wherein N is greater than M.

In a further embodiment, the invention can be characterized as an array processing module comprising: M signal processing chains wherein each of the M signal processing chains is configured to receive a replica of a received signal from a corresponding one of M physical antenna elements; and an interpolation module coupled to the M signal processing chains, wherein the interpolation module is configured to generate N signal response values for the antenna array as a function of the M replicas of the received signal.

BRIEF DESCRIPTION OF THE DRAWINGS

In the accompanying drawings:

FIG. 1 is a block diagram of a conventional diversity receiver in which the signals received by multiple antenna elements are weighted and combined in order to generate an output signal;

FIG. 2 is a block diagram of a conventional spatial-temporal (ST) filtering arrangement;

DETAILED DESCRIPTION OF THE INVENTION

Figure 3:
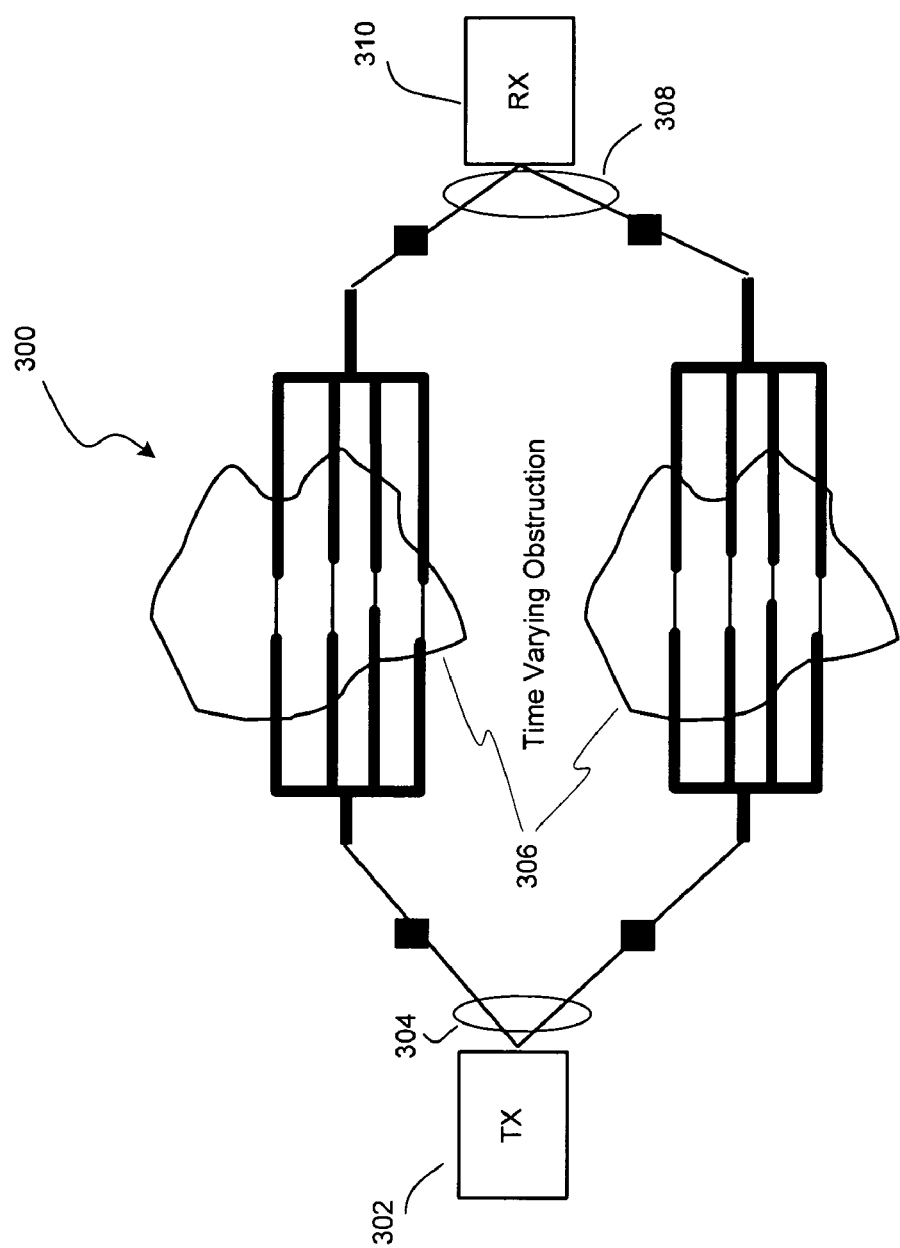
FIG. 3 is a representation of a multiple-input/multiple-output antenna arrangement within a wireless communication system.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

The present invention is directed to a method of effectively increasing the number of antenna elements within a multi-element antenna system through computation of a response of "virtual" antenna elements positioned among physical elements of an antenna array. In accordance with several embodiments of the invention, the physical elements of the array are positioned sufficiently near each other to enable synthesis of a polynomial or other mathematical expression characterizing the response of the array to receipt of an incident waveform. Values of the responses associated with the virtual antenna elements of the array may then be determined through evaluation of the synthesized polynomial or other expression. The resultant array response values associated with the virtual and physical elements of the array may then be provided to an associated receiver for processing.

In this way the present invention enhances performance without inducing the complexity which would be attendant to straightforwardly increasing the number of physical antenna elements and associated signal processing paths. In a particular embodiment, the present invention may be used to desirably reduce the complexity, power consumption and cost associated with the deployment of multiple antenna elements upon mobile devices. This embodiment may be implemented to effectively increase the number of antenna elements from M physical elements to greater than M effective antenna elements. This increase is effected by using available interpolation techniques (e.g., Lagrange interpolation) to create a set of virtual antenna elements interposed between the M physical antenna elements and/or using available extrapolation techniques to create a virtual antenna element at an edge of an antenna array.

The present invention is not limited to mobile devices and may also be applied to infrastructure elements (e.g., base stations and access points). In addition, the present invention is applicable to nearly all known wireless standards and modulation schemes (e.g., GSM, CDMA2000, WCDMA, WLAN, fixed wireless standards, OFDM and CDMA).

In order to facilitate appreciation of the principals of the invention, a brief overview of various conventional multi-element antenna systems designed to mitigate delay spread, interference and fading effects is provided with reference to FIGS. 1–5.

Referring first to FIG. 1, shown is a block diagram of a conventional diversity receiver 100 in which the signals received by multiple antenna elements are weighted and combined in order to generate an output signal. Shown in the conventional diversity receiver 100 are a collection of M antenna elements 102, and coupled with each respective antenna element are parallel receive chains 104, 106, 108 that include respective weighting portions 110, 112, 114. The receive chains 104, 106, 108 all couple with a combiner 116 and a combined single 118 exits from the combiner 116.

With M antenna elements, such an array generally provides an increased antenna gain of "M" as well as a diversity gain against multipath fading dependent upon the correlation of the fading among the antenna elements. In this context the antenna gain is defined as the reduction in required receive signal power for a given average output signal-to-noise ratio (SNR), while the diversity gain is defined as the reduction in the required average output SNR for a given bit error rate (BER) with fading.

For interference mitigation, each of the M antenna elements 102 are weighted at the respective weighting portions 110, 112, 114 and combined in the combiner 116 to maximize signal-to-interference-plus-noise ratio (SINR). This weighting process is usually implemented in a manner that minimizes mean squared error (MMSE), and utilizes the correlation of the interference to reduce the interference power.

Turning now to FIG. 2, a block diagram is shown of a conventional spatial-temporal (ST) filtering arrangement 200. Shown are a first antenna 202 and a second antenna 204 respectively coupled to a first linear equalizer 206 and a second linear equalizer 208. Outputs of each of the first and second linear equalizers 206, 208 are coupled to a combiner 210, and an output of the combiner 201 is coupled to an MLSE/DFE portion 212.

The filtering arrangement of FIG. 2 is designed to eliminate delay spread using joint space-time processing. In general, since the CCI is unknown at the receiver, optimum space-time (ST) equalizers, either in the sense of a minimum mean square error (MMSE) or maximum signal-to-interference-plus-noise ratio (SINR), typically include a whitening filter. For example, linear equalizers (LE) 206, 208 that whiten the CCI both spatially and temporally, and the filtering arrangement of FIG. 2 are typical of such systems. As shown in FIG. 2, the linear equalizers (LE) 206, 208 are followed by a non-linear filter that is represented by the MLSE/DFE portion 212, which is implemented using either a decision feedback equalizer (DFE) or maximum-likelihood sequence estimator (MLSE).

As is known to one of ordinary skill in the art, the turbo principle can also be used to replace the non-linear filters with superior performance, but higher computational complexity. Using ST processing (STP) techniques, SNR gains of up to 4 dB and SINR gains of up to 21 dB have been reported with a modest number of antenna elements.

Referring next to FIG. 3, shown is a generic representation of a multiple-input/multiple-output antenna arrangement within a wireless communication system 300. Shown are a transmitter (TX) 302 coupled to multiple transmit antennas 304, which are shown transmitting a signal via time varying obstructions 306 to multiple receive antennas 308 coupled to a receiver (RX) 310. As shown, multiple antenna elements are deployed at both the transmitter (TX) 302 and receiver (RX) 310 of the wireless communication system 300.

In addition to multiple-input/multiple-output antenna (MIMO) arrangements, other antenna arrangements may be categorized, based upon the number of "inputs" and "outputs" to the channel linking a transmitter and receiver, as follows:

Single-input/single-output (SISO) systems, which include transceivers (e.g., mobile units and a base station) with a single antenna for uplink and down link communications.

Multi-input/single-output (MISO) systems, which include one or more receivers, which downlink via multiple antenna inputs, and one or more transmitters, which uplink via a single antenna output.

Single-input/multi-output (SIMO) systems, which include one or more receivers, which downlink via a single antenna input, and one or more transmitters, which uplink via multiple antenna outputs.

One aspect of the attractiveness of multi-element antenna arrangements, particularly MIMOs, resides in the significant system capacity enhancements that can be achieved using these configurations. Assuming perfect estimates of the applicable channel at both the transmitter and receiver are available, in a MIMO system with M receive antennas the received signal decomposes to M independent channels. This results in an M-fold capacity increase relative to SISO systems. For a fixed overall transmitted power, the capacity offered by MIMOs scale with increasing SNR for a large, but practical, number of M of antenna elements.

In the particular case of fading multipath channels, it has been found that the use of MIMO arrangements permits capacity to be scaled by nearly M additional bits/cycle for each 3-dB increase in SNR. This MIMO scaling attribute is in contrast to a baseline configuration, characterized by M=1, which by Shannon's classical formula scales as one more bit/cycle for every 3-dB of SNR increase. It is noted that this increase in capacity that MIMO systems afford is achieved without any additional bandwidth relative to the single element baseline configuration.

However, widespread deployment of multi-element antenna arrangements in wireless communication systems (particularly within wireless handsets) has been hindered by the resultant increase in complexity and associated increased power consumption, cost and size. These parameter increases result, at least in part, from a requirement in many proposed architectures that a separate receiver chain be provided for each antenna element.

Figure 4:
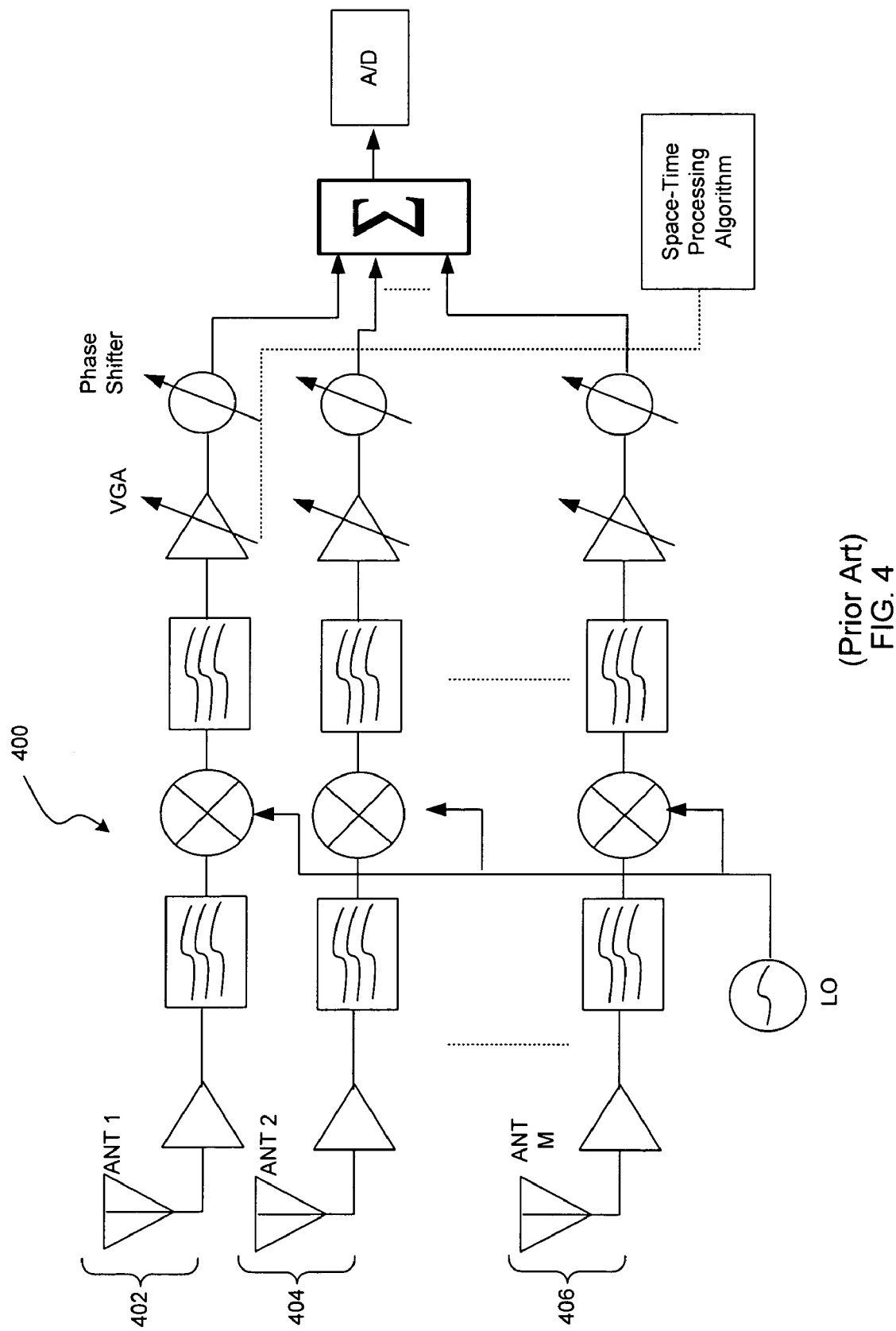
FIG. 4 is a block diagram depicting a conventional architecture of a multiple receive antenna system in the RF domain.

For example, FIG. 4 depicts one conventional architecture of a multiple receive antenna system 400 in the RF domain.

As shown, the implementation of FIG. 4 includes a separate receive chain 402, 404, 406 for each of M antenna elements, and each receive chain 402, 404, 406 includes elements to perform amplification, filtering and mixing. As a consequence, the cost of implementing the system 400 is higher than that of implementing a system with a single receive chain. Moreover, adding additional antenna elements is often prohibited by the added cost, space and/or power associated with additional antenna elements.

The approach exemplified by the system 400 is further disadvantageous because analog phase shifters and variable gain amplifiers are utilized, which renders it relatively expensive and susceptible to performance degradation as a result of aging, temperature variation, and deviation from prescribed tolerances. In addition, because the implementation of FIG. 4 makes use of a phase relationship between the received and transmitted antenna elements (i.e., the path differential delay is maintained throughout each receive processing chain), rigid adherence to tolerances and accurate calibration is required in each RF processing chain.

Figure 5:
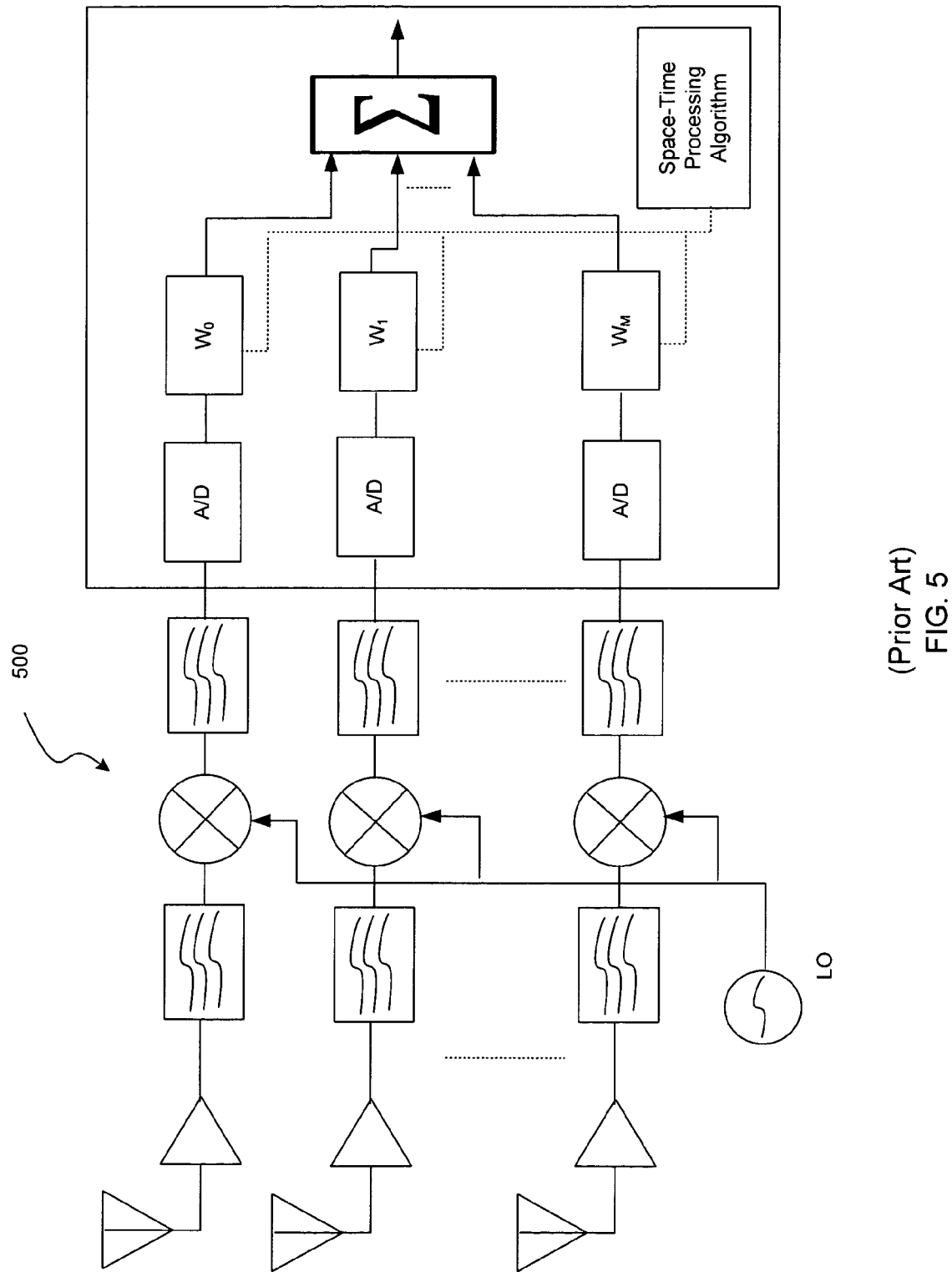
FIG. 5 is a block diagram representing a digital equivalent to the circuit of FIG. 4.

Referring next FIG. 5, shown is a block diagram representing a digital equivalent to the system 400 of FIG. 4. In general, the performance of the digital circuit arrangement 500 of FIG. 5 is degraded for substantially the same reasons as was described above with reference to FIG. 4. That is, the duplication of an entire receiver chain (i.e., from RF to baseband) associated with each antenna element leads to an increase in size, cost, complexity and power consumption. As a result, adding additional antenna elements in multiple receive antenna systems has heretofore been unsuitable for deployment in the handsets and other mobile terminals used within wireless communication systems.

Overview and System Architecture

The present invention is directed to a system and method for implementing multiple antenna elements within mobile devices in a manner that potentially reduces the costs and power consumption which typically accompany multi-element antenna arrangements.

Figure 6:
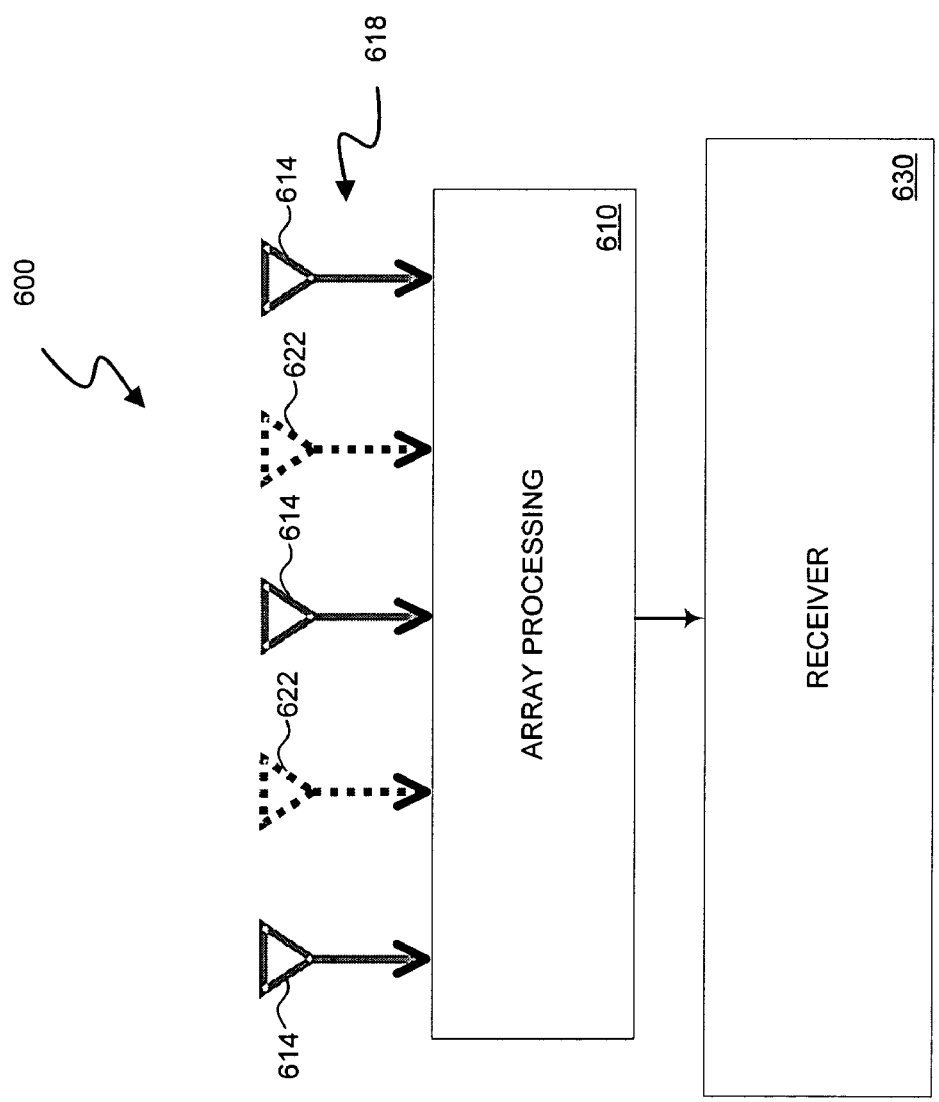
FIG. 6 is a block diagram of a receiver system incorporating an array processing module in accordance with one embodiment of the present invention.
Figure 7:
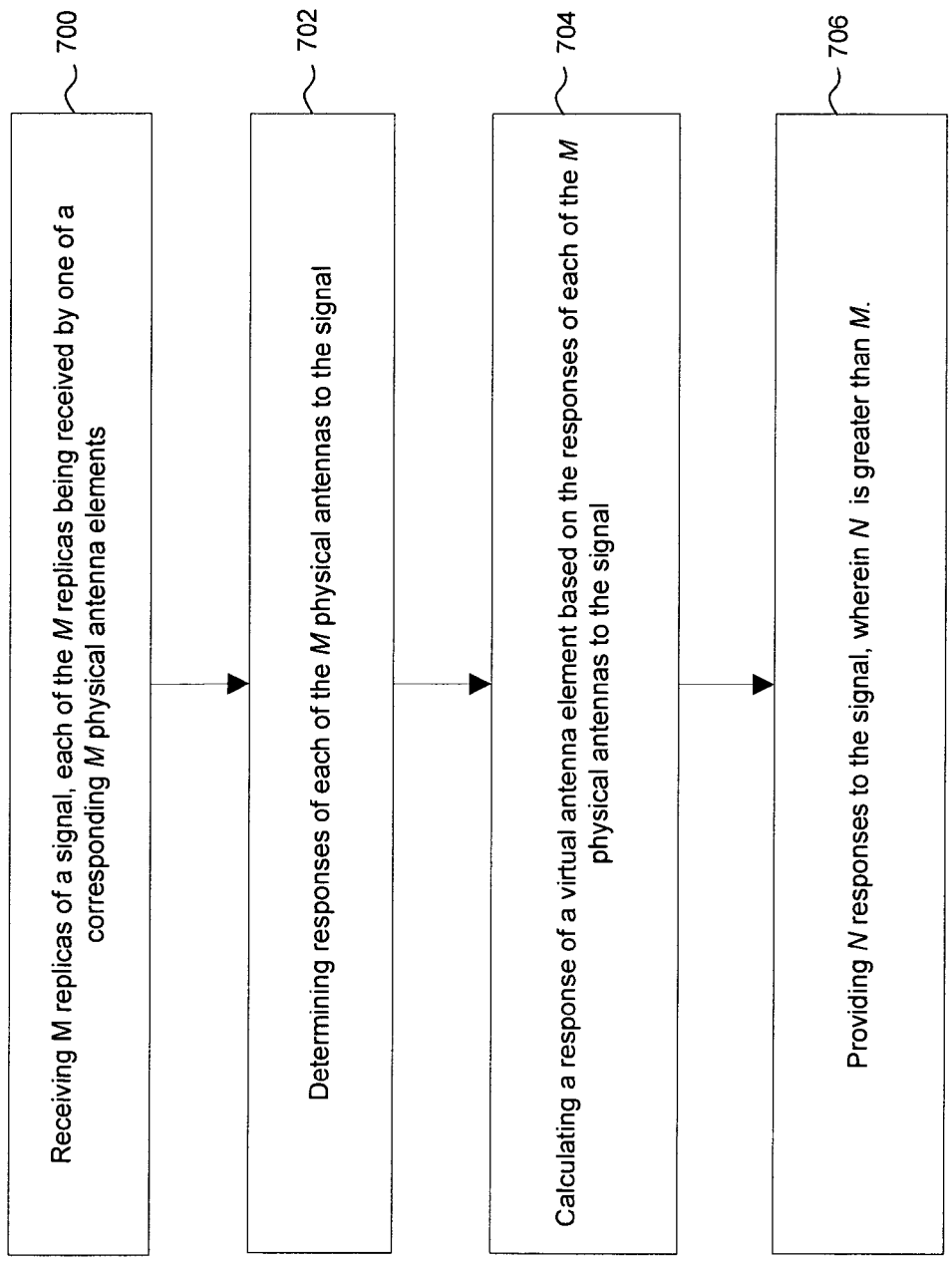
FIG. 7 is a flow chart illustrating steps carried out by the array processing module of FIG. 6 when processing a received signal according to one embodiment.

FIG. 6 is a block diagram of a receiver system 600 incorporating an array-processing module 610 in accordance with one embodiment of the present invention. The array-processing module 610 receives information from M physical antenna elements 614 of an antenna array 618 which has N elements. In addition to the M physical antenna elements 614, the antenna array 618 also effectively includes a set of virtual (i.e., non-physical) antenna elements 622. While referring to FIG. 6, simultaneous reference will be made to FIG. 7, which is a flow chart illustrating steps carried out by the array-processing module 610 when processing a signal received by the antenna array 618.

The array-processing module 610 is operative to synthesize the responses of the virtual antenna elements 622 to waveforms impinging upon the antenna array 618. These responses, together with the responses produced by the M physical antenna elements 614 are then forwarded to a receiver 630 for further processing. In one embodiment, the array-processing module 610 further processes the responses from both the virtual antenna elements 622 and the M physical antenna elements 614 before forwarding them to the receiver 630.

In operation, a signal impinges upon the antenna array 618 and each of the M physical antenna elements 614 receives a replica of the signal. The array-processing module 610 then receives the M replicas of the signal from the M physical antenna elements 614 (Step 700).

Next, the array-processing module 610 determines a response of each of the M physical antenna elements to the signal (Step 702). As discussed further herein, in some embodiments, the response of each of the M physical antenna elements 614 is calculated as a function of a weighting parameter that is associated with each M physical antenna elements 614. In other embodiments, the response of each of the M physical antenna elements 614 is obtained by sampling each of a corresponding one of the M replicas of the signal.

After the responses of the M physical antenna elements 614 are determined, the array-processing module 610 calculates responses of the virtual antenna elements 622 to the signal as a function of the responses of the M physical antenna elements 614 (Step 704). In several embodiments, the response of each of the virtual antenna elements 622 is calculated by interpolating and/or extrapolating responses of at least two of the M physical antenna elements 614.

Thus, the array processing module 610 provides N responses to the signal, i.e., a response for each element of the antenna array 618 (Step 706). The N responses may then be further processed by the array processing module 610 before being forwarded to the receiver 630.

Advantageously, the array processing module 610 effectively provides the receiver 630 with an antenna array having N (e.g., five) elements, notwithstanding that only M (e.g., three) physical antenna elements 614 are deployed. As a consequence, the array processing module provides the advantages of an antenna array which has N physical elements without the associated cost and power consumption typically associated with N receiver chains.

It should be noted that the array processing module 610 may be implemented as a set of instructions that are performed in dedicated hardware, firmware or in software using a processor or other machine to execute the instructions to accomplish the provided functionality. It should also be noted that the array processing module 610 and the receiver 630 are illustrated as separate blocks in FIG. 6 for purposes of describing specific functions carried out by the array processing module 610, but the processing module 610 may share the same hardware utilized by the receiver. Furthermore, the array processing module 610 may be incorporated as part of the receiver 630.

Figure 8A:
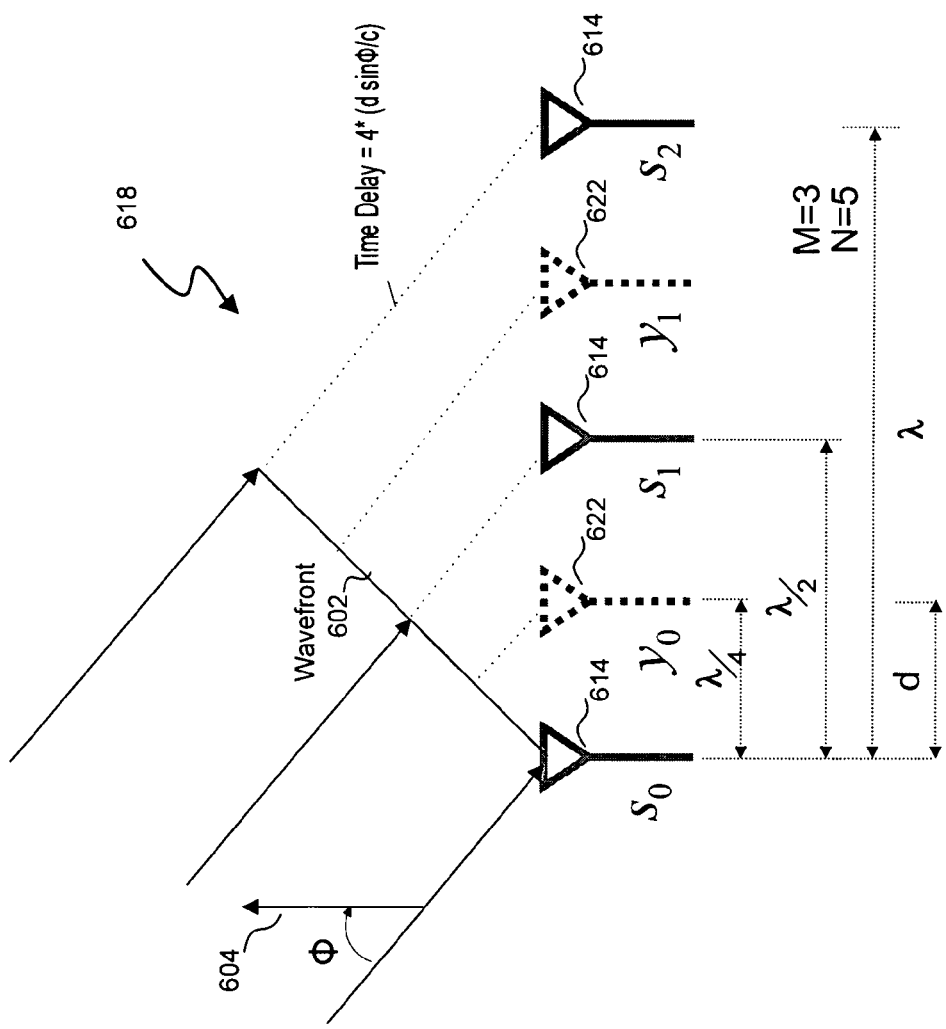
FIG. 8A is an illustrative representation of a specific implementation of the antenna array of FIG. 6.
Figure 8B:
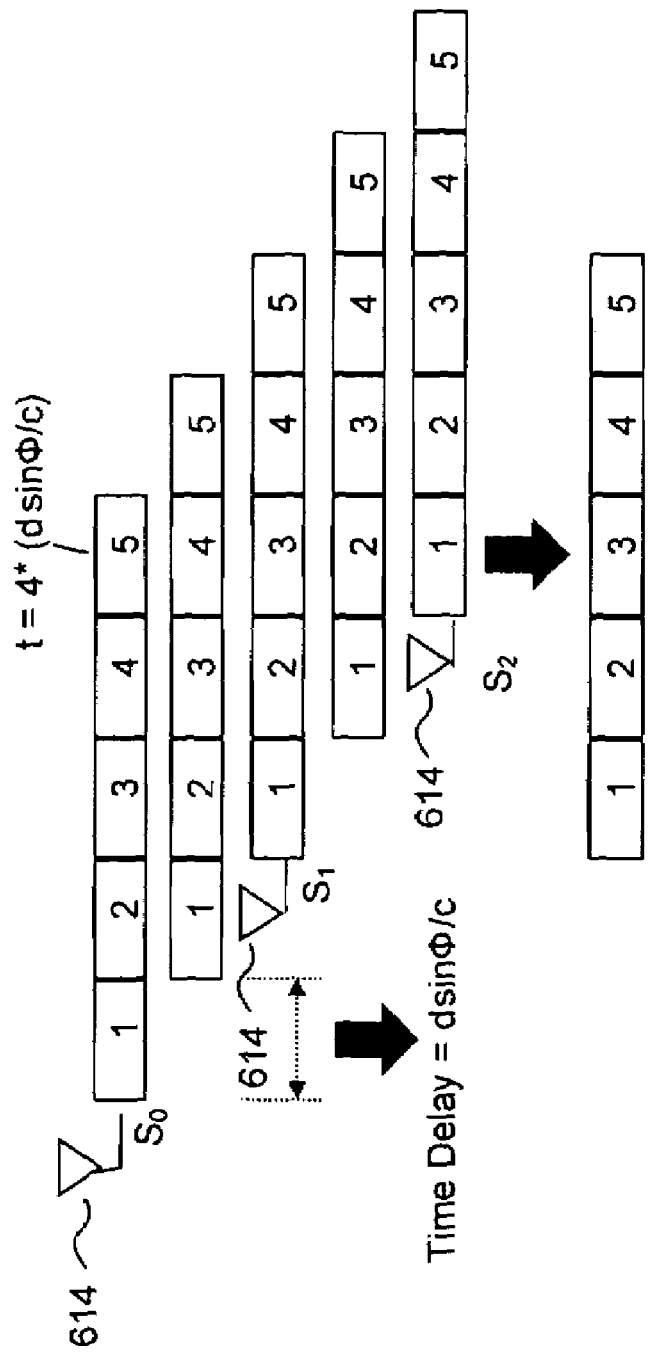
FIG. 8B is an illustrative representation of replicas of a signal received by elements of the antenna array of FIG. 6 as a function of time.

Turning now to FIGS. 8A and 8B, shown is an illustrative representation of the antenna array 618 exposed to a signal 602 and a representation of replicas of the signal received by elements the antenna array 618 as a function of time, respectively. As will be described hereinafter, adjacent ones of the physical antenna elements 614 are spatially separated by no more than a distance $\lambda/2$, where $\lambda$ represents the wavelength of the signal energy received by the antenna array 618. As shown, the antenna array 618 includes a set of three physical antenna elements 614 (i.e., M=3) and two virtual antenna elements 622, thereby effectively yielding a 5-element array (i.e., N=5). As shown in FIG. 8A, as a wave front of the signal 602 approaches the antenna array 618 from left to right at an angle $\phi$ with respect to a direction 604 normal to a the antenna array 618, a first signal replica $S_0$ is received at a left most physical antenna element first, and the right most antenna element 614, which is separated from the left most physical antenna element 614 by a distance of 4*d, will not receive a corresponding replica $S_2$ of the signal until 4*(dsin $\phi$/c) seconds later.

As shown in FIG. 8B, after a delay of 4*(dsin $\phi$/c) seconds the right most physical antenna element 614 receives the replica $S_2$ of the signal. As a consequence, after the replica $S_2$ of the signal is received at the right most antenna, the left most antenna has received the signal for five periods (of dsin $\phi$/c seconds each). As shown, after a delay of 4*(dsin $\phi$/c)

seconds, a response of the entire antenna array 618 may be calculated by interpolating responses of the physical antenna elements 614 to the signal replicas $S_0$, $S_1$, $S_2$.

The principles of the present invention may be further appreciated by reference to various aspects of time-frequency signal processing. In this regard it is observed that a filter is characterized by values of its impulse response, $h_m$, spaced regularly with a time T between samples. A linear shift-invariant system is also characterized by the frequency response:

$$H(e^{j\omega T}) = \sum_{m=0}^{M-1} h_m e^{-jm\omega T} \quad (1)$$

which is given in equation (1) for a finite length impulse response comprised of M samples, represented by $\{t_m\}$. Consistent with the well-known sampling theorem, in order to prevent any phase ambiguities from arising it is necessary for the sampling interval (T) and the angular frequency ($\omega$) to be set such that the argument in the exponent of (1) satisfies the relationship $\omega T \leq \pi$.

Figure 9:
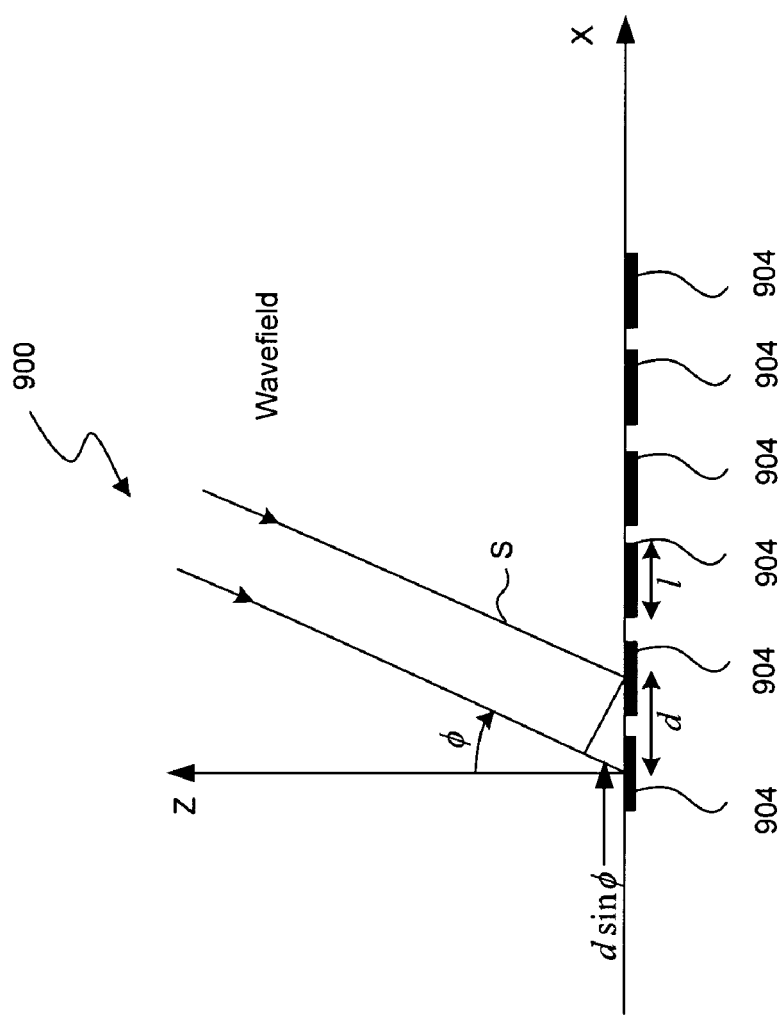
FIG. 9 is a diagram illustrating a uniform linear antenna array disposed to receive a signal.

Referring now to FIG. 9, a uniform linear antenna array 900 is seen to include a plurality of physical array elements 904. The array elements 904 are of element length l, and are mutually separated by an element distance d. In addition, a signal waveform S impinges upon the linear antenna array 900 from an angular direction $\phi$. If it is assumed that the array 900 includes M physical array elements 904 regularly spaced with a distance d, then these array elements 904 are located at $x_m$=md for m=0, . . . ,M−1. The array 900 may be characterized by an aperture smoothing function which may be expressed as $$W(u) = \sum_{m=0}^{M-1} w_m e^{-jm2\pi(u/\lambda)d} \quad (2)$$

where $w_m$ is a weighting parameter associated with each array element, $\phi$ is the angle (i.e., the azimuth angle) between broadside of the array 900 and the direction of the incident waveform of wavelength $\lambda$, and where the variable u is defined by the expression u=sin$\phi$. In the exemplary embodiment the weights $w_m$ define a standard windowing function or can be adaptively altered according to specified criteria.

It may be appreciated that certain aspects of the expression in equation (2) may be derived from the geometry of FIG. 9. Specifically, for an incident waveform originating at an infinite distance from array 900, the difference in the distance traveled between two neighboring elements 904 is d sin $\phi$. When this distance is converted to phase angle, the result is the expression in the exponent of equation (2) (where each wavelength $\lambda$ of distance traveled corresponds to $2\pi$). In summary, formulation and computation of the array smoothing function of equation (2) involves weighting the responses of all elements of the array 900, summing the weighted responses, and outputting the sum of the weighted responses.

It is noted that the aperture smoothing function of equation (2) indicates the manner in which the Fourier transform of the incident waveform is "smoothed" or otherwise altered as a consequence of observation through a finite aperture. This may be considered analogous to the role of the frequency response characterizing a filtering operation, which reveals the way in which the spectrum of the received signal is smoothed by such filtering operation.

Given the analogous relationship between equations (1) and (2), the present invention recognizes that the constraints needing to be imposed upon the parameters in equation (1) to prevent an aliasing condition from arising in equation (1) permit development of similar "anti-aliasing" constraints in equation (2). In particular, the argument in the exponent of equation (2) must satisfy the following constraint to ensure that an aliasing condition does not arise:

$$2\pi \frac{|u|}{\lambda} d = |k_x| \cdot d \leq \pi \quad (3)$$

where $k_x = 2\pi u/\lambda$ is the x-component of the wave number.

The relationship between the array pattern for the one-dimensional array of FIG. 9 and a filter frequency response may now be expressed as:

$$\omega \leftrightarrow k_x = 2\pi \frac{u}{\lambda} \quad (4)$$

$$T \leftrightarrow d$$

$$h_n \leftrightarrow w_n$$

$$\{t_m\} \leftrightarrow M$$

In view of equation (4), the time-frequency sampling constraint $T \leq \pi/\omega_{max}$ may be expressed as a spatial domain sampling constraint $d \leq \lambda_{min}/2$.

In accordance with the invention, it has been recognized by the inventors that the relationships set forth in equation (4) allow time domain interpolation techniques to be applied to linear antenna arrays in order to enable computation of the responses of "virtual antennas" that may be either interposed between the physical elements of the array or positioned at an edge of an array. That is, application of interpolation and extrapolation techniques to the responses generated by the physical elements of a linear array (e.g., the array 618, 900) permits derivation of responses of various virtual antennas among the physical elements of the array, (e.g., the array 618, 900). As was mentioned above, this concept is illustratively represented by the placement of virtual antenna elements 622 among the physical antenna elements 614 in FIG. 8A.

Various well known time domain interpolation and extrapolation techniques may be used to generate the responses of the virtual array elements 622 on the basis of the responses of the physical elements 614, 904 of the array 618, 900. It may be appreciated that such "sampling" within the spatial domain effectively amounts to an estimation of an array response given a specific antenna geometry, input signal carrier frequency and angle of incidence of the received waveform. Time domain estimation approaches such as, for example, Lagrange techniques and Radial Basis Function (RBF) networks may be utilized for interpolation and extrapolation, however, Lagrange techniques are less effective than RBF techniques for extrapolating. Since RBF networks may be used to solve nonlinearly separable classification problems, such networks can also be employed to perform interpolation and/or extrapolation operations upon a set of data points in a multi-dimensional space. Those skilled in the art will appreciate that other interpolation and extrapolation techniques may be utilized in a manner consistent with the invention, and that the above techniques should be considered illustrative and not of exclusive utility. Those of ordinary skill in the art will also appreciate that the effectiveness of interpolating and extrapolating depends upon the correlation among the antennas.

A specific example of the use of interpolation and extrapolation techniques to determine the responses of virtual antennas distributed throughout an array of physical antenna elements will now be provided. Considering equation (7) below, a polynomial of degree n may be constructed so as to coincide with a given function at n+1 uniform or non-uniform points using Lagrange interpolation. For present purposes, the Lagrange interpolation theorem contemplates that given n+1 distinct (real or complex) points, $z_0, z_1, \ldots, z_n$ and n+1 (real or complex) values, $w_0, w_1, \ldots, w_n$, there exists a unique polynomial $p_n(z) \in \wp_n$ for which $$p_n(z_i) = w_i, \forall_i = 0, 1, \ldots, n. \quad (5)$$

In view of the transformations into the spatial domain set forth in (2)–(4), the expression in (5) may be used to derive a Lagrange spatial interpolation theorem:

$$p_m(d_i) = w_i, \forall_i = 0, 1, \ldots, m. \quad (6)$$

where $d_i$ is the spacing between adjacent elements of an antenna array.

Lagrange interpolation may be alternately characterized as a method of finding a polynomial y=f(x) which passes through a specified set of n points {x(i), y(i)}, $1 \leq i \leq n$, in a plane. Only a single condition is placed upon the points; namely, that all points should have different x-coordinates. That is, x(i)=x(j) if and only if i=j. Such a polynomial is defined as follows. For $1 \leq j \leq n$, let $$p(j, x) = \prod_{i \neq j} \{x - x(i)\} \quad (7)$$

The expression in equation (7) is zero at every one of the n points except x(j), where it is nonzero. Next, let $$y = f(x) = \sum_{j=1}^{n} y(j) p(j, x) / p(j, x(j)) \quad (8)$$

The polynomial in equation (8) is nominally of degree n−1, and has the property that f(x(i))=y(i) for every i. As an example, a polynomial is constructed using equation (8) on the basis of two points {x(1), y(1)} and {x(2), y(2)}. In this case, p(1, x)=x−x(2), and p(2, x)=x−x(1). Continuing:

$$y = f(x) \quad (9)$$

$$= y(1)[x - x(2)]/[x(1) - x(2)] + y(2)[x - x(1)]/[x(2) - x(1)] \quad (10)$$

$$= x[y(1) - y(2)]/[x(1) - x(2)] + [x(1)y(2) - x(2)y(1)]/[x(1) - x(2)]$$

$$y - y(2) = x[y(1) - y(2)]/[x(1) - x(2)] + \quad (11)$$

$$[x(2)y(2) - x(2)y(1)]/[x(1) - x(2)]$$

-continued $$= x[y(1) - y(2)]/[x(1) - x(2)] -$$

$$x(2)[y(1) - y(2)]/[x(1) - x(2)][y - y(2)]/[y(1) - y(2)]$$

$$= [x - x(2)]/[x(1) - x(2)]$$

It is observed that equation (11) corresponds to an equation of a line through the two points {x(1), y(1)} and {x(2), y(2)}.

Consider now a numerical example involving three points (−2,5), (0,1), and (3,7). Then $$p(1, x) = (x-0)(x-3) = x^2 - 3x$$

$$p(2, x) = (x+2)(x-3) = x^2 - x - 6 \quad (12)$$

$$p(3, x) = (x+2)(x-0) = x^2 + 2x$$

Now $$y = f(x) \quad (13)$$

$$= 5(x^2 - 3x)/10 + 1(x^2 - x - 6)/(-6) + 7(x^2 + 2x)/15$$

$$= 4/5 x^2 - 2/5 x + 1$$

$$= \frac{4x^2 - 2x + 5}{5}$$

This may be checked as follows:

$$f(-2) = (16+4+5)/5 = 5$$

$$f(0) = (0+0+5)/5 = 1 \quad (14)$$

$$f(3) = (36-6+5)/5 = 7.$$

Referring again to FIG. 8, the spatial interpolation contemplated by equation (6) may be applied to develop the array 618. In particular, the three physical antenna elements 614 (i.e., M=3) of the array 618 may be extended into a five-element antenna system (i.e., N=2×3−1=5) by deriving a suitable polynomial using Lagrange spatial interpolation (it being understood that different interpolation schemes may yield different numbers of virtual antennas given M physical antennas). The responses of the virtual antennas 622 of the array 618 may then be obtained by evaluating the polynomial at desired locations between the physical antennas of the array 618. The array 618, which contains three physical elements 614 and two virtual elements 622, will have the same statistical properties in a correlated environment as a linear antenna array containing five physical elements. This property enables construction of a sparse array based upon a conventional array having regular spacing between elements. In the example of FIG. 8, the antenna spacing, $d_m = \lambda/2$ and $d_n = \lambda/4$, is uniform but such uniformity is not a required criteria. That is, the teachings of the present invention may also be used to construct a random array, in one or more dimensions, in which a certain fraction of the elements are removed at random.

The antenna element spacing (i.e., spatial sampling) can be optimized using the criteria of minimization of the maximum sidelobe energy, or minimization of the sidelobe energy. By optimizing both the antenna element spacing and the array weighting function, it is possible to construct a non-uniform antenna array with optimal spatial suppression.

This optimization may be effected by using an optimization criteria such as optimal interference suppression. For example, a predefined training sequence applied to the array could be utilized as weighting criteria in connection with optimization of the weights associated with the array elements.

Figure 10:
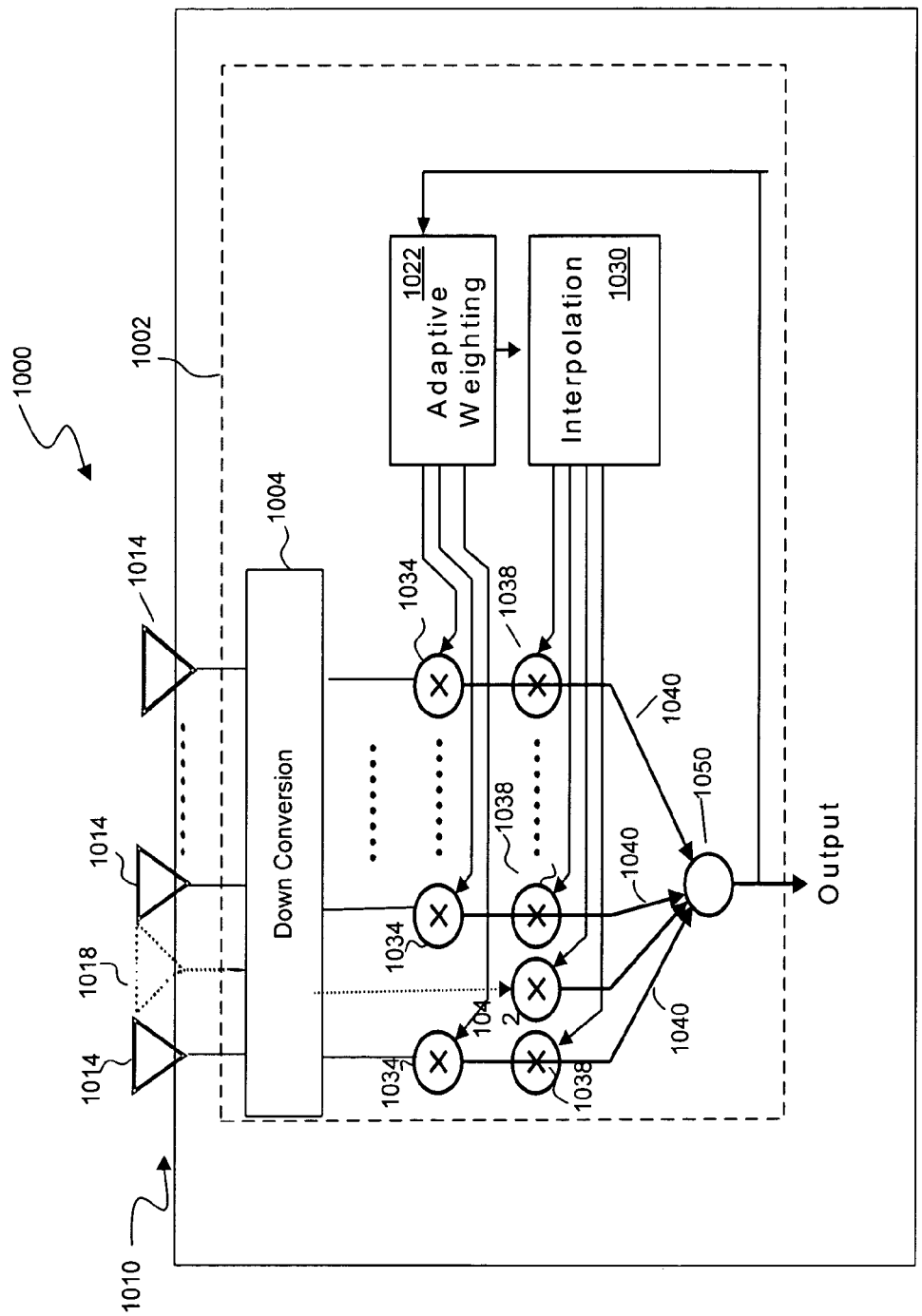
FIG. 10 is a block diagram depicting an antenna system incorporating a virtual-element antenna array established in accordance with the present invention.

Turning now to FIG. 10, there is shown an antenna system 1000 incorporating a virtual-element antenna array 1010 established in accordance with the present invention. The array 1010 includes M physical antenna elements 1014 and one or more virtual antenna elements 1018 which may be positioned among the M physical antenna elements 1014. A down conversion portion 1004 is coupled to the M physical antenna elements 1014, and is operable to convert signal replicas received at each of the M physical antenna elements 1014 from RF to baseband.

In this embodiment, the down conversion portion 1004 is within the array-processing module 1002 and is coupled to each of M physical signal processing chains 1040, which receive baseband replicas of the received signal from the down conversion portion 1004. As shown, the M physical antenna elements 1040 are coupled to a summing portion 1050 via the M physical signal processing chains 1040.

The array-processing module 1002 further includes an adaptive weighting module 1022 and an interpolation module 1030 operatively connected to a first plurality of physical weighting elements 1034 and a second plurality of physical weighting elements 1038, respectively. As shown, each of the first plurality of physical weighting elements 1034 are coupled with a corresponding one of the M physical signal processing chains 1040. Each of the second plurality of physical weighting elements 1038 are also coupled with a corresponding one of the M physical signal processing chains 1040, but are coupled "down stream" along the physical processing chains 1040 relative to the first plurality of physical weighting elements 1034. In the present embodiment, the interpolation module 1030 is also operatively connected to one or more virtual weighting elements 1042, which are coupled to the summing portion 1050.

Figure 11:
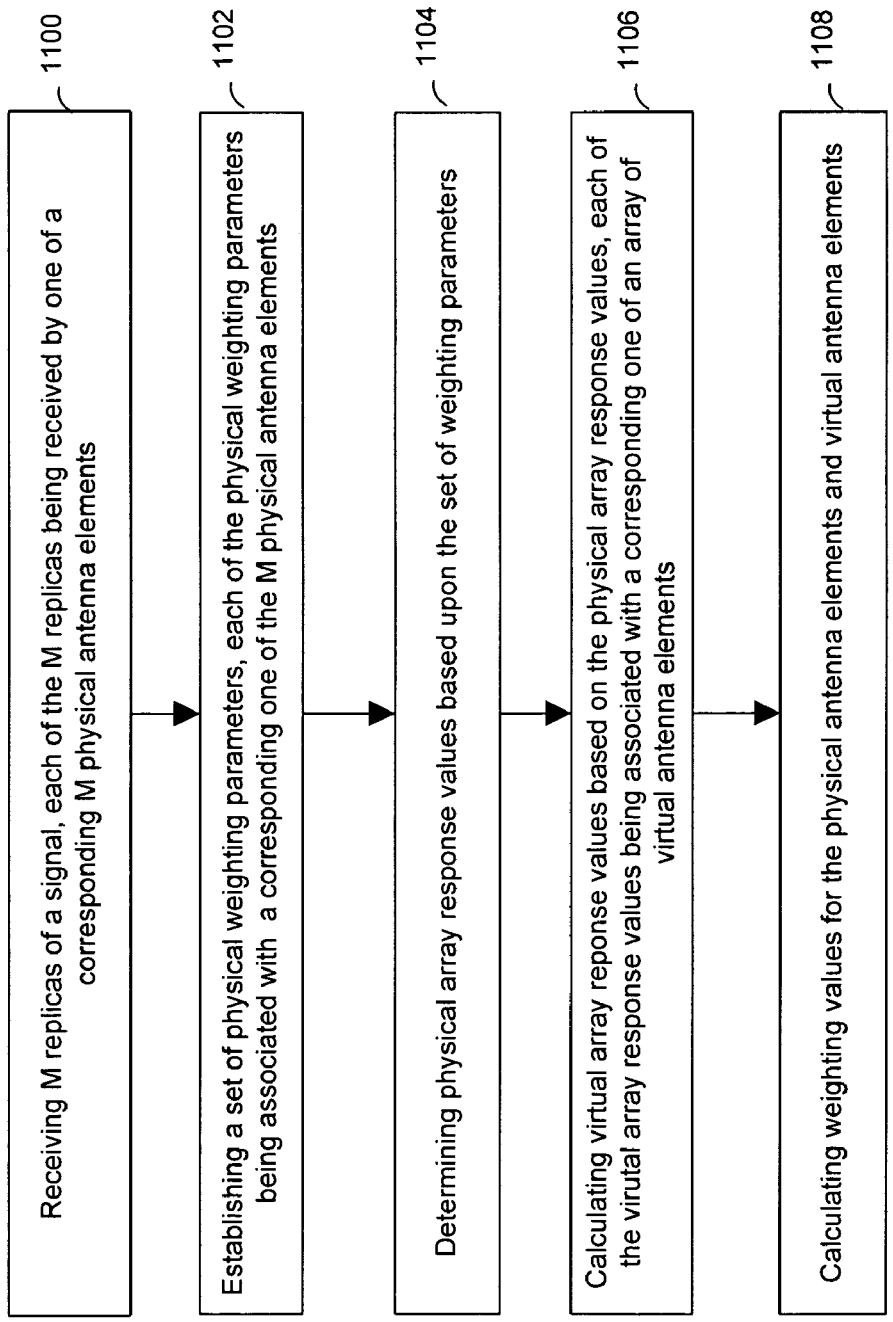
FIG. 11 is a flowchart illustrating steps carried out by the antenna system of FIG. 10 according to one embodiment of the present invention.

The first plurality of physical weighting elements 1034 are iteratively adjusted in accordance with predefined algorithms executed by the adaptive weighting module 1022. Similarly, the second plurality of physical weighting elements 1038 and the one or more virtual weighting elements 1042 are iteratively adjusted in accordance with predefined algorithms executed by the interpolation module 1030. While referring to FIG. 10, simultaneous reference will be made to FIG. 11, which is a flowchart illustrating steps carried out by the antenna system 1600 according to one embodiment of the present invention.

It should be recognized that the interpolation module 1030 is not limited to performing interpolation calculations. As one of ordinary skill in the art will appreciate, the interpolation module 1030 may be used to extrapolate response values of virtual antenna elements from response values of physical antenna elements; thus a response value for a virtual antenna element located at an end of an antenna array may be calculated.

During operation of the antenna system 1000, each of the M physical antenna elements 1014 receives a replica of a signal (Step 1100). As a consequence, each of the physical signal processing chains 1040 receives one of M replicas of the signal. Based on the M replicas of the signal, the adaptive weighting module 1022 establishes M corresponding physical weighting parameters (Step 1102). Specifically, the physical weighting parameters (that are to be ascribed to the first plurality of physical weighting elements 1034) are initially determined by way of a constraint adaptive algorithm executed by the adaptive weighting module 1022. Such an adaptive algorithm processes the input to the antenna array 1010 (i.e., the M replicas of the signal) and calculates a set of weighting parameters (e.g., complex values) to be associated with the first set of physical weighting elements 1034.

After execution of a number of iterations of the adaptive algorithm by the adaptive weighting module 1022, a response value for each of the M physical antenna elements 1014 is determined as a function of a corresponding one of the weighting parameters (Step 1104) using, for example, equation 2. The M response values (corresponding to the M physical antenna elements 1014) are then interpolated by any of the techniques previously discussed in order to calculate the response value of the one or more virtual antenna elements 1018 (Step 1106). The resulting response values for the one or more virtual antenna elements 1018 and the response values for the M physical antenna elements 1014 collectively provide an array response.

The resulting array response is then used by the interpolation module 1030 to calculate a new set of weight parameters for the physical weighting elements 1038 and virtual weighting element(s) 1042 (Step 1108). The weighted signals from the physical weighting elements 1038 and virtual weighting element(s) 1042 are then combined at the summing portion 1050, which provides a representation of the received signal at an output of the antenna-processing module 1002.

Figure 12:
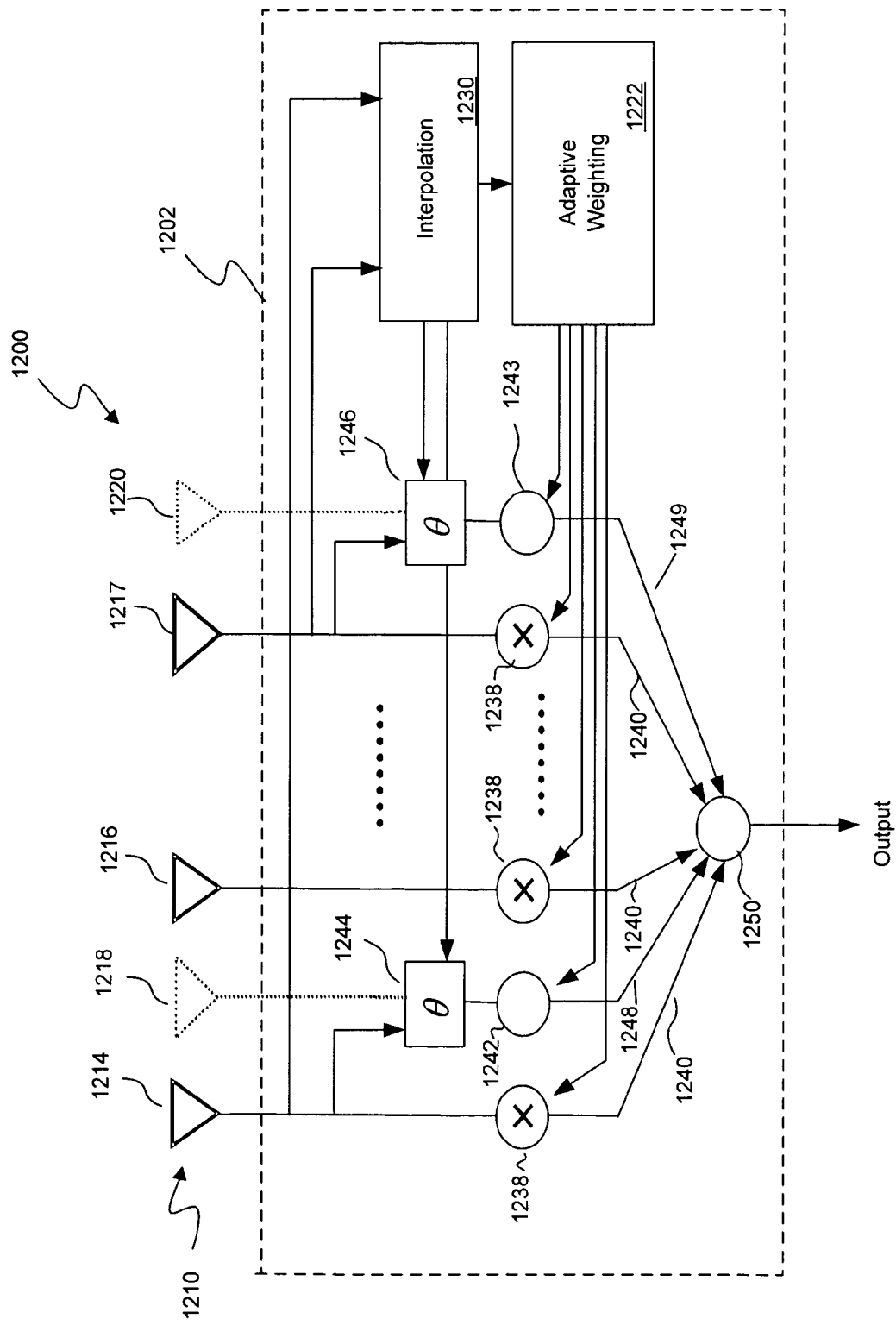
FIG. 12 is a block diagram depicting another antenna system incorporating a virtual-element antenna array established in accordance with another embodiment of the present invention.

Referring next to FIG. 12, there is shown an antenna system 1200 incorporating a virtual-element antenna array 1210 established in accordance with another embodiment of the present invention. The antenna array 1210 includes N total antenna elements, which includes first, second and third physical antenna elements 1214, 1216, 1217 as well as first and second virtual antenna elements 1218, 1220. The first virtual antenna element 1218 is shown interposed between the first and the second physical antenna elements 1214, 1216 and the second virtual antenna element 1220 is shown at an edge of the antenna array 1210 adjacent to the third physical antenna element 1217. The first, second and third physical antenna elements 1214, 1216, 1217 are a subset of a collection of M physical antenna elements, which are a subset of the N total antenna elements in the antenna array 1210.

Coupled to each of the M physical antenna elements is a corresponding one of M physical signal processing chains 1240, which are shown within an array-processing module 1202. As shown, each of the M physical processing chains 1240 terminates at a summing portion 1250, and along each of the M physical processing chains 1240 is a physical weighting element 1238.

The array-processing module 1202 also includes first and second virtual signal generators 1244, 1246, which are coupled to a first and second virtual signal processing chains 1248, 1249, respectively. The first and second virtual signal processing chains 1248, 1249 terminate at the summing portion 1250 and include first and second virtual weighting elements 1242, 1243, respectively.

In this embodiment, an interpolation module 1230 in the array-processing module 1202 is coupled to each of the M physical signal processing chains 1240 so that it is capable of sampling a signal replica received at each of the M physical antenna elements. The interpolation module 1230 is also coupled to the first and second virtual signal generators 1244, 1246, which function to generate signals representative of the received signal at spatial locations of the first and second virtual antenna elements 1218, 1220, respectively.

It is contemplated that the processing performed by the array-processing module 1200 may be performed at RF and/or at baseband. The interpolation module 1230, for example, may sample and operate on RF signals, while the adaptive weighting portion 1222 calculates weight parameters for baseband signals. Alternatively, both the interpolation module 1230 and the adaptive weighting module 1222 may operate in the RF domain. For purposes of describing the operation of the antenna system 1200, however, it is assumed that the interpolation module 1230 and the adaptive weighting module 1222 are operating in the baseband domain, i.e., replicas of a received signal are down converted by a down conversion portion (not shown) before being sampled.

In operation, when a received signal impinges upon the antenna array 1210, each of the M physical antenna elements receives a corresponding one of M replicas of the signal. The interpolation module 1230 then determines a response of each of the M physical antenna elements to the signal by sampling each of a corresponding one of the M replicas of the signal.

The interpolation module 1230 then calculates a response of the first and second virtual antenna elements 1218, 1220 as a function of the M sampled signal replicas. This calculation involves interpolating responses of the first and second physical antenna elements 1214, 1216 to determine a response of the first virtual antenna element 1218, and extrapolating responses of at least a portion of the M physical antenna elements (including the third physical antenna element 1217) to determine a response of the second virtual antenna element 1220. These calculations may be performed according to any of the techniques previously discussed to calculate the response values of the first and second virtual antenna elements 1218, 1220. One of ordinary skill in the art will appreciate that there must be a sufficient correlation (established by antenna spacing) among the M physical antenna elements before the interpolation and extrapolation techniques are effective.

In the present embodiment, the amplitude of the M sampled signal replicas is assumed to be the same across the antenna array 1210, and only phase values of the first and second virtual antenna elements 1218, 1220 are calculated by one of the previously discussed techniques. In other embodiments, however, signal amplitude and phase information for the M sampled signal replicas is utilized to calculate response values for virtual antenna elements.

The interpolation module 1230 then provides each of the first and second virtual signal generators 1244, 1246 with separate phase information, which is utilized by the virtual signal generators 1244, 1246 to generate a first and second virtual antenna responses for the first and second antenna elements 1218, 1220, respectively. In the present embodiment, the phase information is a phase offset, which when multiplied by a signal replica received at a physical antenna element, provides a virtual antenna element response for a virtual antenna element adjacent to the physical antenna element.

As shown in FIG. 12, for example, the replica of the signal received at the first physical antenna element 1214 is provided to the first virtual signal generator 1244 where the replica of the signal is multiplied by a phase offset to generate a response to the first virtual antenna element 1218, which represents a response to the received signal at the spatial location of the first virtual antenna element 1218. Similarly, the replica of the signal received at the third physical antenna element 1217 is provided to the second virtual signal generator 1246 where the replica of the signal is multiplied by a phase offset to generate a response to the second virtual antenna element 1218, which represents a response to the received signal at the spatial location of the second virtual antenna 1220.

As a result, the array-processing module 1202 generates N responses to the received signal as a function of M received signal replicas; namely, the M responses generated from the M physical antenna elements and the calculated responses of the first and second virtual antenna elements 1218, 1220.

In the present embodiment, each of the M responses to the signal is weighted by a weighting parameter (calculated by the adaptive weighting module 1222) at a corresponding one of the physical weighting elements 1238, and the responses to the first and second virtual antenna elements 1218, 1220 are weighted by a weighting parameter at the first and second virtual weighting elements 1242, 1243, respectively. The weighted responses of the M physical antenna elements and the weighted responses of the first and second virtual antenna elements 1218, 1220 are then combined at the summing portion 1250 to form a signal representative of the signal received at the antenna array 1210, which is provided as an output of the array processing module 1202.

Figure 13:
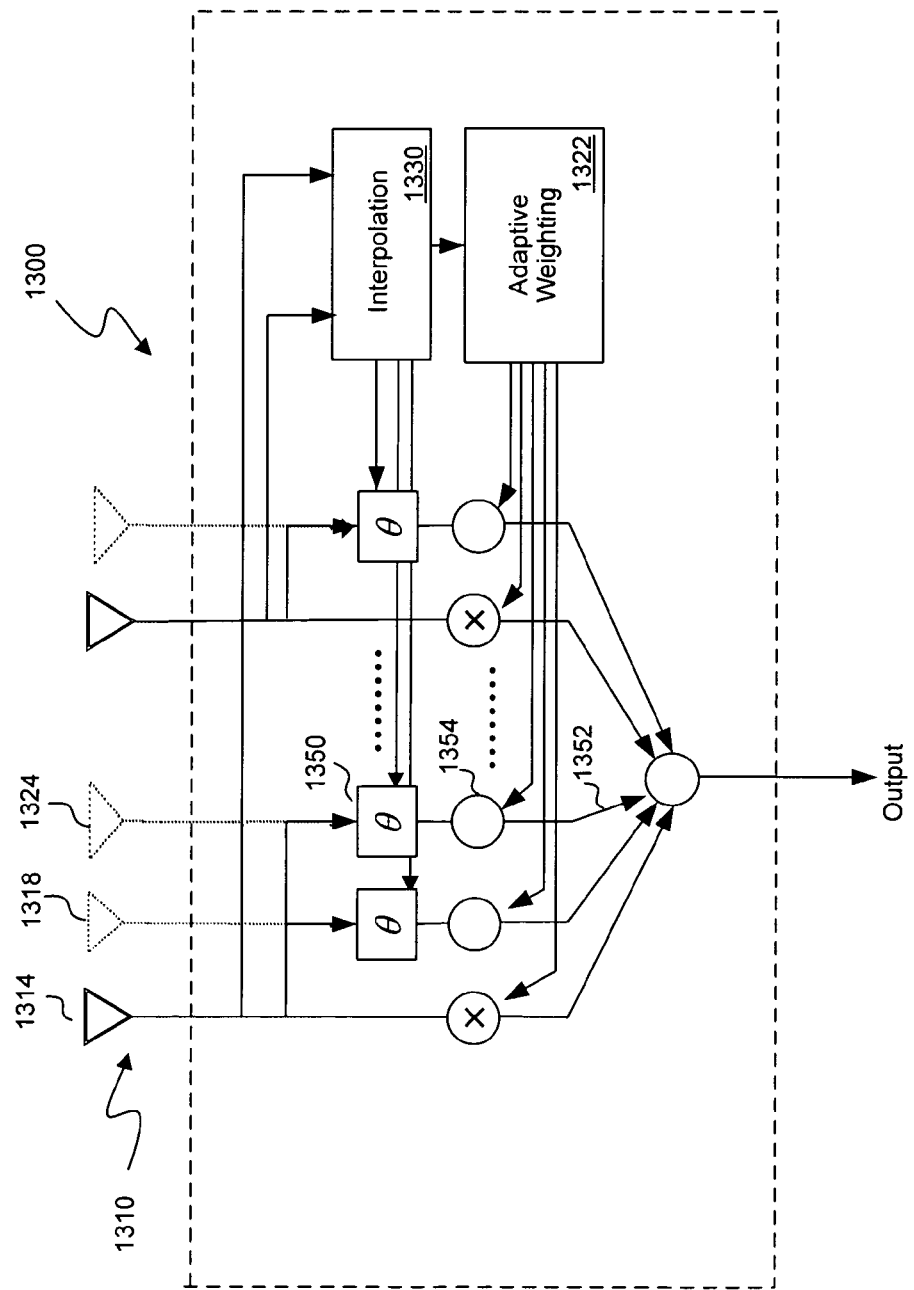
FIG. 13 is a block diagram depicting yet another antenna system incorporating a virtual-element antenna array established in accordance with yet another embodiment of the present invention

Referring next to FIG. 13, there is shown an antenna system 1300 incorporating a virtual-element antenna array 1310 established in accordance with yet another embodiment of the present invention. In this embodiment, the antenna system 1300 is the same as the antenna system 1200 except that a third virtual antenna element 1324 is in place of the second physical antenna element 1216. Additionally, the physical processing chain 1240 associated with the second physical antenna element 1216 has been replaced with a third virtual processing chain 1352, which is coupled to a third virtual signal generator 1350 and includes a third virtual weighting element 1354.

As shown, in this embodiment the third virtual signal generator 1350 generates a response to the third virtual antenna element 1324 by multiplying a replica of a signal received at a first physical antenna element 1314 by a phase offset provided by the interpolation module 1330. As a consequence, responses of two adjacent virtual antenna elements 1318, 1324 are generated for subsequent processing. One of ordinary skill in the art will appreciate that the two adjacent virtual antenna elements 1318, 1324 must be close enough to at least two correlated physical antenna elements of the antenna array 1310 to provide an accurate representation of responses of the two adjacent virtual antennas 1318, 1324 to a received signal.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An array processing module comprising:
   M signal processing chains wherein each of the M signal processing chains is configured to receive a replica of a received signal from a corresponding one of M physical antenna elements; and
   an interpolation module coupled to the M signal processing chains, wherein the interpolation module is configured to generate N signal response values for the antenna array as a function of the M replicas of the received signal, wherein N is greater than M.

2. The array processing module of claim 1 including:
   a weighting module coupled to the M signal processing chains wherein the weighting module is configured to calculate M physical weighting parameters as a function of the M replicas of the received signal, wherein each of the M physical weighting parameters is associated with a corresponding one of the M physical antenna elements;
   wherein the interpolation module is configured to generate the N signal response values for the antenna array as a function of the M physical weighting parameters.

3. The array processing module of claim 1 including:
   a weighting module coupled to the M signal processing chains wherein the weighting module is configured to calculate N weighting parameters as a function of the N signal response values; and
   N weighting elements configured to receive the N signal response values, wherein each of the N weighting elements weights each of a corresponding one of the N signal response values by a corresponding one of the N weighting parameters, thereby generating N weighted signal response values.

4. The array processing module of claim 3 including:
   a summing portion configured to receive the N weighted signal response values from the N weighting elements and provide a combined signal representative of the received signal.

5. The array processing module of claim 1 including:
   a down conversion portion coupled to each of the M signal processing chains, wherein the down conversion portion is configured to convert the M replicas of the received signal from radio frequency (RF) to baseband frequency.

6. A method for processing a signal received by an antenna array comprising:
   receiving M replicas of the signal, each of the M replicas being received by one of a corresponding M physical antenna elements of the antenna array;
   determining M responses of the M physical antenna elements to the signal, each of the M responses corresponding to one of the M physical antenna elements; and
   generating, as a function of the responses of the M physical antenna elements to the signal, N responses to the signal, respectively associated with N spatial locations along the antenna array, wherein at least one of the N spatial locations is not coincident with a location of any of the M physical antenna elements and is placed at a non-equidistant location between two successive physical antenna elements, and wherein (N−M) responses of the N responses are associated with virtual antenna elements located among the physical antenna elements.

7. The method of claim 6, wherein at least one of the (N−M) responses is generated by interpolating at least two of the M responses.

8. The method of claim 6, wherein at least one of the (N−M) responses is generated by extrapolating from at least two of the M responses.

9. An antenna system for receiving a signal comprising:
   an antenna array including M physical antenna elements, wherein the M physical antenna elements are spatially arranged to receive one of a corresponding M replicas of the signal so as to be capable of generating M replicas of the received signal; and
   an array processing module including M signal processing chains, wherein each of the M signal processing chains is coupled to one of the M physical antenna elements;
   wherein the array processing module is configured to generate N signal response values for the antenna array as a function of the M replicas of the received signal;
   wherein the N signal response values include at least one virtual antenna response value, wherein N is greater than M, and
   wherein the array processing module comprises:
      a weighting module coupled to the M signal processing chains wherein the weighting module is configured to calculate M physical weighting parameters as a function of the M replicas of the received signal, wherein each of the M physical weighting parameters is associated with a corresponding one of the M physical antenna elements; and
      an interpolation module coupled to the M signal processing chains, wherein the interpolation module is configured to generate the N signal response values for the antenna array as a function of the M physical weighting parameters.

10. The antenna system of claim 9, wherein the interpolation module is configured to calculate the M signal response values as a function of the M physical weighting parameters and interpolate at least two of the M signal response values to provide the virtual antenna response value.

11. An antenna system for receiving a signal comprising:
   an antenna array including M physical antenna elements, wherein the M physical antenna elements are spatially arranged to receive one of a corresponding M replicas of the signal so as to be capable of generating M replicas of the received signal; and
   an array processing module including M signal processing chains, wherein each of the M signal processing chains is coupled to one of the M physical antenna elements;
   wherein the array processing module is configured to generate N signal response values for the antenna array as a function of the M replicas of the received signal;
   wherein the N signal response values include at least one virtual antenna response value, wherein N is greater than M, and
   wherein the array-processing module comprises:
      an interpolation module coupled to the M signal processing chains, wherein the interpolation module is configured to generate the N signal response values for the antenna array as a function of the M replicas of the signal; and
      a weighting module coupled to the M signal processing chains wherein the weighting module is configured to calculate N weighting parameters as a function of the N signal response values.

12. An antenna system for receiving a signal comprising:
an antenna array including M physical antenna elements, wherein the M physical antenna elements are spatially arranged to receive one of a corresponding M replicas of the signal so as to be capable of generating M replicas of the received signal; and
an array processing module including M signal processing chains, wherein each of the M signal processing chains is coupled to one of the M physical antenna elements;
wherein the array processing module is configured to generate N signal response values for the antenna array as a function of the M replicas of the received signal; wherein the N signal response values include at least one virtual antenna response value, wherein N is greater than M, wherein the N signal response values for the antenna array include M signal response values corresponding to the M physical antenna elements, wherein the virtual antenna response value corresponds to a virtual antenna element positioned within a distance of $\lambda/2$ of at least two of the physical antenna elements, wherein $\lambda$ represents a wavelength of a carrier frequency of the signal, and wherein the virtual antenna element is located at an edge of the antenna array.

13. An antenna system for receiving a signal comprising:
an antenna array including M physical antenna elements, wherein the M physical antenna elements are spatially arranged to receive one of a corresponding M replicas of the signal so as to be capable of generating M replicas of the received signal; and
an array processing module including M signal processing chains, wherein each of the M signal processing chains is coupled to one of the M physical antenna elements;
wherein the array processing module is configured to generate N signal response values for the antenna array as a function of the M replicas of the received signal; wherein the N signal response values include at least one virtual antenna response value, wherein N is greater than M, and wherein the array processing module is configured to generate N signal response values for the antenna array as a function of the M replicas of the received signal by methodologies selected from the group consisting of interpolation and extrapolation.

14. A receiver system for receiving a signal comprising:
an antenna array including M physical antenna elements for receiving M replicas of the signal, each of the M replicas being received by a corresponding one of the M physical antenna elements;
means for determining a response of each of the M physical antenna elements to the signal;
and
means for generating, as a function of the responses of the M physical antenna elements to the signal, N responses to the signal, respectively associated with N spatial locations along the antenna array, wherein at least one of the N spatial locations is not coincident with a location of any of the M physical antenna elements and is placed at a non-equidistant location between two successive physical antenna elements, and wherein (N−M) responses of the N responses are associated with virtual antenna elements located among the physical antenna elements.

15. The receiver system of claim 14 wherein the means for generating includes means for generating at least one of the (N−M) responses by interpolating at least two of the M responses.

16. The receiver system of claim 14 wherein the means for generating includes means for generating at least one of the (N−M) responses by extrapolating from at least two of the M responses.

* * * * *